United States Patent
Kitagawa et al.

(10) Patent No.: US 10,429,752 B2
(45) Date of Patent: Oct. 1, 2019

(54) ELECTROPHOTOGRAPHIC PHOTOCONDUCTOR, MANUFACTURING METHOD THEREOF, AND ELECTROPHOTOGRAPHIC APPARATUS USING THE SAME

(71) Applicant: FUJI ELECTRIC CO., LTD., Kawasaki-shi, Kanagawa (JP)

(72) Inventors: Seizo Kitagawa, Matsumoto (JP); Toshiki Takeuchi, Guang Dong (CN); Kazuya Saito, Matsumoto (JP)

(73) Assignee: FUJI ELECTRIC CO., LTD., Kawasaki-Shi, Kanagawa (JP)

( * ) Notice: Subject to any disclaimer, the term of this patent is extended or adjusted under 35 U.S.C. 154(b) by 0 days.

(21) Appl. No.: 16/117,144

(22) Filed: Aug. 30, 2018

(65) Prior Publication Data

US 2018/0373172 A1    Dec. 27, 2018

Related U.S. Application Data

(63) Continuation of application No. PCT/JP2017/007253, filed on Feb. 24, 2017.

(51) Int. Cl.
*G03G 5/00* (2006.01)
*G03G 5/047* (2006.01)
(Continued)

(52) U.S. Cl.
CPC ............. *G03G 5/047* (2013.01); *C08G 64/06* (2013.01); *G03G 5/051* (2013.01); *G03G 5/0525* (2013.01);
(Continued)

(58) Field of Classification Search
CPC .................. G03G 5/0564; G03G 5/14756
(Continued)

(56) References Cited

U.S. PATENT DOCUMENTS

| 4,882,253 A | 11/1989 | Kato et al. |
| 2011/0091799 A1 | 4/2011 | Nakamura et al. |

(Continued)

FOREIGN PATENT DOCUMENTS

| JP | H03-256050 A | 11/1991 |
| JP | H04-241359 A | 8/1992 |

(Continued)

*Primary Examiner* — Mark A Chapman
(74) *Attorney, Agent, or Firm* — Rabin & Berdo, P.C.

(57) ABSTRACT

Provided is a positively charged electrophotographic photoconductor, a manufacturing method thereof, and an electrophotographic apparatus using the same. The positively charged electrophotographic photoconductor includes an electroconductive support and a single layer-type photosensitive layer provided thereon including a charge generation material, a hole transport material, an electron transport material, and a mixed binder resin. Alternately, the positively charged electrophotographic photoconductor includes an electroconductive support; a charge transport layer provided on the electroconductive support and containing at least a hole transport material, and a binder resin; and a charge generation layer provided on the charge transport layer and including at least a charge generation material, a hole transport material, an electron transport material, and a mixed binder resin. In either embodiment, the mixed binder resin contains at least two resins including a polycarbonate-based resin selected to provide the mixed binder resin with a water vapor permeability ranging from 5 to 13 g/m²·day.

19 Claims, 3 Drawing Sheets

(51) Int. Cl.
  *G03G 5/147* (2006.01)
  *C08G 64/06* (2006.01)
  *G03G 5/05* (2006.01)
  *G03G 5/06* (2006.01)

(52) U.S. Cl.
  CPC ......... *G03G 5/0564* (2013.01); *G03G 5/0592* (2013.01); *G03G 5/0596* (2013.01); *G03G 5/0614* (2013.01); *G03G 5/0616* (2013.01); *G03G 5/0668* (2013.01); *G03G 5/0672* (2013.01); *G03G 5/0696* (2013.01); *G03G 5/14756* (2013.01)

(58) Field of Classification Search
  USPC .................................................. 430/96, 66
  See application file for complete search history.

(56) References Cited

U.S. PATENT DOCUMENTS

2012/0003574 A1   1/2012   Kitagawa et al.
2014/0199619 A1   7/2014   Kitagawa et al.
2015/0346619 A1   12/2015   Kitagawa et al.

FOREIGN PATENT DOCUMENTS

| | | |
|---|---|---|
| JP | H04-242259 A | 8/1992 |
| JP | H05-12702 B2 | 2/1993 |
| JP | H05-45915 A | 2/1993 |
| JP | H05-30262 B2 | 5/1993 |
| JP | H05-47822 B2 | 7/1993 |
| JP | H07-160017 A | 6/1995 |
| JP | 2001-142234 A | 5/2001 |
| JP | 2003-228184 A | 8/2003 |
| JP | 2004-240056 A | 8/2004 |
| JP | 2007-121733 A | 5/2007 |
| JP | 2007-163523 A | 6/2007 |
| JP | 2007-206130 A | 8/2007 |
| JP | 2007-256768 A | 10/2007 |
| JP | 2009-288569 A | 12/2009 |
| JP | 2010-276699 A | 12/2010 |
| JP | 2014-092594 A | 5/2014 |
| JP | 2014-109683 A | 6/2014 |
| TW | 2015-12233 A | 4/2015 |
| WO | WO-2009/104571 A1 | 8/2009 |
| WO | WO-2013/021430 A1 | 2/2013 |

ELECTROPHOTOGRAPHIC PHOTOCONDUCTOR, MANUFACTURING METHOD THEREOF, AND ELECTROPHOTOGRAPHIC APPARATUS USING THE SAME

CROSS-REFERENCE TO RELATED APPLICATIONS

This non-provisional application is a continuation of International Application No. PCT/JP2017/007253 filed on Feb. 24, 2017, the entire contents of which are incorporated herein by reference.

BACKGROUND OF THE INVENTION

1. Field of the Invention

The present invention relates to an electrophotographic photoconductor (hereinafter simply referred to as "photoconductor") and an electrophotographic apparatus using the same, and more particularly to an electrophotographic photoconductor for use in an electrophotographic printer, copying machine, fax machine and the like, and to an electrophotographic apparatus using the same.

2. Background of the Related Art

Generally, an image forming apparatus using an electrophotographic system such as a printer, a copying machine, and a facsimile machine comprises a photoconductor as an image carrier; a charging apparatus for uniformly charging the surface of the photoconductor; an exposure apparatus for writing an electrical image (electrostatic latent image) corresponding to the image on the surface of the photoconductor; a development apparatus for developing the electrostatic latent image with a toner to form a toner image; and a transfer apparatus for transferring the toner image onto a transfer sheet. The image forming apparatus further comprises a fixing apparatus for making the toner on this transfer paper to be fused on the transfer paper.

For such an image forming apparatus, a photoconductor to be used may vary depending on the concept of the apparatus. At present, an organic photoconductor (OPC) in which an organic pigment is dispersed in a resin has been widely used because of its excellent stability, cost, and ease of handling, except for an inorganic photoconductor such as Se and a-Si used for a large machine and/or a high-speed machine. An organic photoconductor is generally of negatively charged type, whereas an inorganic photoconductor is of positively charged type. It is because hole transport materials having a good hole transport function have been developed for negatively charged type organic photoconductors, whereas electron transport materials having a good electron transport function have been hardly developed for positively charged type organic photoconductors.

On the other hand, in the negative charging process for such a negatively charged type organic photoconductor, since the negative corona discharge generates overwhelmingly larger amount of ozone compared to the positive corona discharge, the amount of ozone generation is suppressed by adopting a contact charging system such as roller charging or brush charging. However, this contact charging system is disadvantageous in terms of cost and high-quality image because of its tendency of generating contamination of the charging member and difficulty in homogenization of surface potential of the photoconductor, as compared with the non-contact positive charging system.

In order to solve these problems, it is effective to apply a positively charged type organic photoconductor. There is a need for a high performance positively charged type organic photoconductor. In addition to the merit peculiar to the positive charging system as described above, the positively charged type organic photoconductor is advantageous in less lateral diffusion of a carrier and excellent dot reproducibility (resolution and gradation) because the position of the carrier generated is generally near the surface of the photosensitive layer. For this reason, positively charged type organic photoconductors have been put on the market in various fields where resolution improvement has been advanced.

As a low-cost, compact, high-resolution and high-speed monochrome or color machine making full use of this advantage, there is a cleaner-less process apparatus of non-magnetic one-component contact developing system using positively charged polymerized toner which is expanding the market because high image quality is obtained.

Positively charged type organic photoconductors are roughly divided into four types of layer constitutions as described below, and various kinds have been conventionally proposed. The first one is a function separation type photoconductor having two-layer constitution in which a charge transport layer and a charge generation layer are sequentially laminated on an electroconductive support (see, for example, Patent Document 1). The second one is a function separation type photoconductor having a three-layer constitution in which a surface protective layer is laminated on the two-layer structure mentioned above (see, for example, Patent Document 2). The third one is a function separation type photoconductor having a two-layer constitution, in which a charge generation layer and a charge (electron) transport layer are laminated in the order contrary to the first one (for example, see Patent Document 3). The fourth one is a single layer type photoconductor in which a charge generation material, a hole transport material and an electron transport material are dispersed in the same layer (see, for example, Patent Document 3). In the classifications of the above four types, the presence or absence of an undercoat layer is not considered.

Among them, the fourth one, i.e., a single layer type photoconductor has been studied in detail and has been widely applied. However, in a single layer type photoconductor, there is a limit to achieving both high sensitivity/high speed and high durability. Therefore, a laminated type positively charged photoconductor in which a charge transport layer and a charge generation layer are laminated sequentially has also been proposed (see, for example, Patent Document 4). The layer structure of this laminated type positively charged photoconductor is similar to the layer structure of the first one described above. However, the charge generation material contained in the charge generation layer can be reduced and, at the same time, the electron transport material can be included to provide a thicker film similar to the charge transport layer of the lower layer, and the amount of the hole transport material added in the charge generation layer can be reduced. Accordingly, the resin percentage in the charge generation layer can be set to be higher than that in the conventional single layer type, making it easy to achieve both high sensitivity and high durability.

RELATED ART DOCUMENTS, PATENT DOCUMENTS

PATENT DOCUMENT 1: JPH05-30262B;
PATENT DOCUMENT 2: JPH05-47822B;

PATENT DOCUMENT 3: JPH05-45915A; and
PATENT DOCUMENT 4: JP2009-288569A

However, both single layer type positively charged organic photoconductor and laminate type positively charged organic photoconductor can provide high image quality when used in the cleaner-less process of the nonmagnetic one-component contact developing system using the above-mentioned polymerized toner, but they are suffered from problems, that is, a mixture of toner and paper powder adheres to be deposited onto the surface of the photoconductor and thus cannot be removed from the surface, during printing in a high-temperature and high-humidity environment.

That is, in this case, a material deposited onto the surface of the photoconductor absorbs moisture in the air, resulting in reduced resistance value just below it, locally dropped potential and leakage, as well as tendency to generate minute image defects, i.e., black spots for a monochrome machine and color spots for a color machine, during the initial printing in a high-temperature and high-humidity environment.

The mixture of toner and paper powder has high hygroscopicity. Therefore, the deposited matter on the surface of the photosensitive layer continuously absorbs moisture from the atmosphere, and supplies the moisture into the photosensitive layer. Therefore, the resistance value of the photosensitive layer immediately below the deposited matter is extremely lower than those of other portions, and, at the time of printing, the blank portion (charged portion) is accompanied with charge potential loss due to local reduction and/or leakage of charge potential while the toner is developed, producing black spots or color spots. Here, the diameter of a black spot and a color spot is about 0.5 mm or less.

For this reason, countermeasures have been conventionally taken to increase the pressure resistance by the following methods. The first countermeasure is to make the film thickness of the photosensitive layer thicker than the conventional one, for example, the film thickness of 20 to 30 μm is increased to 31 to 40 μm. Alternatively, it has also been conducted to reduce the roughness of the substrate by changing the processing condition of the substrate (electroconductive support) from the cutting processing to the mirror surface processing; or to add a resin film or an anodic oxidation coating as a barrier layer between the substrate and the photosensitive layer.

However, since they do not fundamentally inhibit the deposition of the mixture of toner and paper powder onto the surface of the photosensitive layer, they fail to eliminate the generation of minute black spots. Actually, as shown in FIG. 4, this is evident from the fact that the correlation between the pressure resistance (leakage start time) of the photosensitive layer and the number of minute black spots generated is not always clear.

Accordingly, an object of the present invention is to solve the above problems and to provide an electrophotographic photoconductor which provides a stable high-quality image in any environment without generating minute black spots or color spots during the initial printing in a high-temperature and high-humidity environment even when mounted on a high-quality/high-speed monochrome machine or a tandem color machine equipped with a cleaner-less process of nonmagnetic one-component contact developing system using polymerized toner; a manufacturing method thereof; and an electrophotographic apparatus using the same.

SUMMARY OF THE INVENTION

The present inventors have conducted intensive studies on measures to prevent generation of minute black spots and color spots due to deposition of a mixture of toner and paper powder on the surface of the photoconductor in a high-temperature and high-humidity environment. As a result, the present inventors have found that using a resin having a water vapor permeability in a predetermined range as a resin used for the outermost layer of the photoconductor can suppress the generation of minute black spots and the like during the initial printing in a high-temperature and high-humidity environment.

That is, the electrophotographic photoconductor according to the first aspect of the present invention, which is a positively charged electrophotographic photoconductor, comprising: an electroconductive support; and a single layer type photosensitive layer provided on the electroconductive support, which includes a charge generation material, a hole transport material, an electron transport material and a binder resin; wherein the binder resin contains a polycarbonate-based resin and the water vapor permeability of the binder resin is in the range from 5 to 13 $g/m^2 \cdot day$.

That is, the electrophotographic photoconductor according to the second aspect of the present invention, which is a positively charged electrophotographic photoconductor, comprising: an electroconductive support; a charge transport layer containing at least a hole transport material and a binder resin, and provided on the electroconductive support; and a charge generation layer provided on the charge transport layer, which includes at least a charge generation material, a hole transport material, an electron transport material and a binder resin; wherein the binder resin in the charge generation layer contains a polycarbonate-based resin and the water vapor permeability of the binder resin is in the range from 5 to 13 $g/m^2 \cdot day$.

The aforementioned binder resin having the water vapor permeability of 5 to 13 $g/m^2 \cdot day$ may contain a resin having a repeating unit represented by formula (1) below. Alternatively, it may contain a resin having a repeating unit represented by the formula (1) below and a resin having a repeating unit represented by formula (2) below. Furthermore, the binder resin having the aforementioned water vapor permeability in the range from 5 to 13 $g/m^2 \cdot day$ may contain a resin having a repeating unit represented by the formula (2) below and a resin having a repeating unit represented by formula (3) below. In the photoconductor of the present invention, it is preferable that the charge generation material contains at least titanyl phthalocyanine.

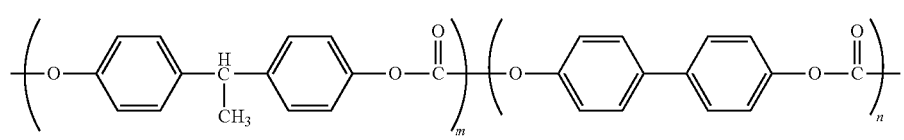

(1)

$m/(m+n) = 0.6 \sim 0.9$

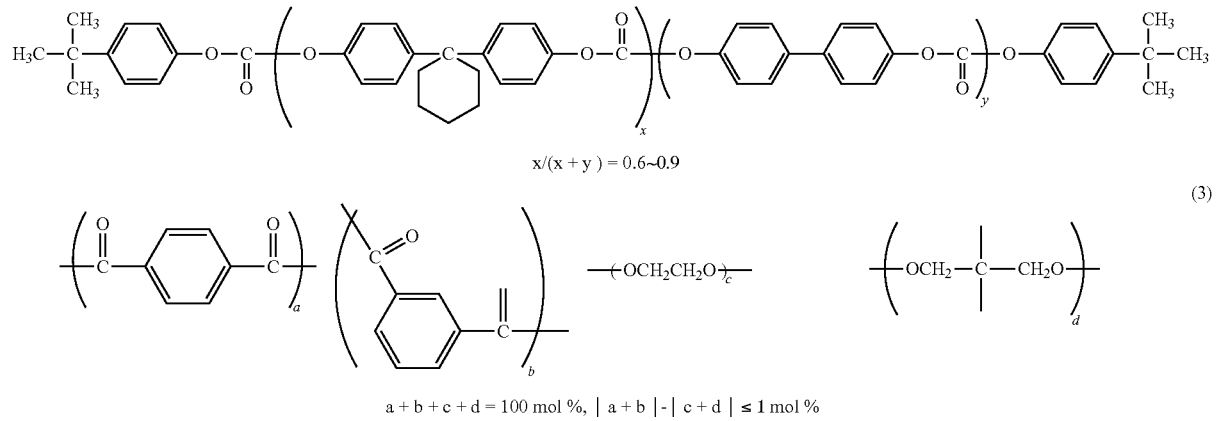

A method for producing an electrophotographic photoconductor according to the third aspect of the present invention is a method for manufacturing the electrophotographic photoconductor mentioned above, characterized in that a layer which contains a binder resin having the water vapor permeability in the range from 5 to 13 g/m²·day is formed using a dip coating method.

An electrophotographic apparatus according to the fourth aspect of the present invention is equipped with the electrophotographic photoconductor mentioned above.

The electrophotographic apparatus may be provided with a cleaner-less process of a nonmagnetic one-component contact developing system using polymerized toner.

Effects of the Invention

According to the present invention, it is possible to attain a electrophotographic photoconductor which provides a stable, high-quality image in any environment without generating minute black spots or color spots during the initial printing in high-temperature and high-humidity environment even when mounted on a high-quality/high-speed monochrome machine or a tandem color machine equipped with a cleaner-less process of nonmagnetic one-component contact developing system using polymerized toner; a manufacturing method thereof; and an electrophotographic apparatus using the same.

DETAILED DESCRIPTION OF THE INVENTION

The embodiments of the present invention will be hereinafter described in detail with reference to the drawings. The present invention is not limited at all by the following explanation.

Figure 1:
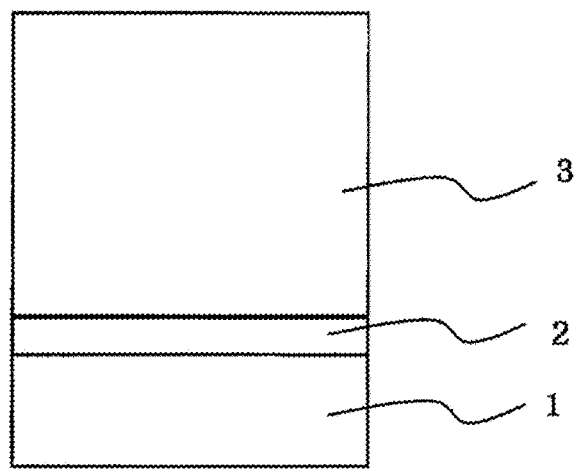
FIG. 1 is a schematic cross-sectional view showing a configuration example of a single layer type positively charged electrophotographic photoconductor of the present invention.
Figure 2:
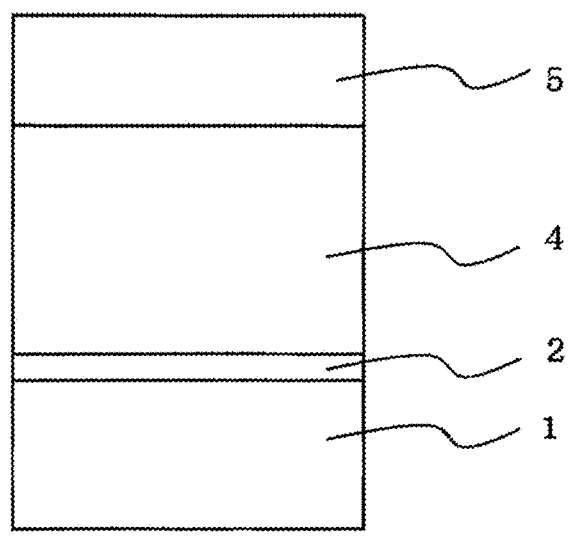
FIG. 2 is a schematic cross-sectional view showing a configuration example of the laminate type positively charged electrophotographic photoconductor of the present invention.

FIG. 1 and FIG. 2 show schematic cross-sectional views showing a configuration example of the electrophotographic photoconductor of the present invention. FIG. 1 shows a single layer type positively charged electrophotographic photoconductor comprising a single layer type photosensitive layer 3 on an electroconductive support 1 with an undercoat layer 2 interposed therebetween; FIG. 2 shows a laminate type positively charged electrophotographic photoconductor comprising a charge transport layer 4 and a charge generation layer 5 sequentially formed on an electroconductive support 1 with an undercoat layer 2 interposed therebetween.

In the electrophotographic photoconductor of the present invention of both single layer type and laminate type, the water vapor permeability of the binder resin contained in the outermost layer is in the range from 5 to 13 g/m²·day, particularly preferably in the range from 6 to 12 g/m²·day. Using the resin contained in the outermost layer which has the water vapor permeability in a predetermined range, moisture adsorbed on the surface of the photoconductor may become uniform, and even in a high-temperature and high-humidity environment, deposition of a mixture of toner and paper powder as well as generation of minute black spots and color spots during the initial printing can be suppressed. When the water vapor permeability of the binder resin contained in the outermost layer is less than 5 g/m²·day, the adsorbed moisture tends to be unevenly distributed, and the mixture of toner and paper powder tends to deposit more easily, and when it exceeds 13 g/m²·day, the film density decreases, resulting in increased water content and reduced resistance value, or the number of the generated black spots or color spots may be increased due to the influence of the discharge produced gas, and image fogging may be generated due to reduced charge potential. In the present invention, the water vapor permeability of the binder resin contained in the outermost layer means, in the case where two or more binder resins are contained, the water vapor permeability of a mixture of the two or more binder resins.

Specifically, as the binder resin used in the present invention, it is preferable to use, as an essential resin, a polycarbonate-based resin such as a bisphenol A type, a bisphenol Z type, a bisphenol A type-biphenyl copolymer or the like depending on the dispersion stability and mechanical strength of the charge generation material used in a combination thereof, which is preferably mixed with an appropriate amount of an arbitrary resin having the water vapor permeability higher than that of the polycarbonate-based resin such as a polystyrene-based resin, a polyester-based resin, a polyarylate-based resin or the like to obtain a desired water vapor permeability.

As the polycarbonate-based resin, for example, a resin having a repeating unit represented by formula (1) below can be suitably used. In addition, a resin having a repeating unit represented by the formula (1) below and a resin represented by formula (2) below are also preferably used in combination. In addition, a polycarbonate-based resin having a repeating unit represented by the formula (2) below and a polyester resin having a repeating unit represented by formula (3) below are also preferably used in combination. In the case of a resin having repeating units represented by the formulae below, the value of the water vapor permeability changes only by about ±5%, so long as the ratio of the repeating units satisfy the following:

Undercoat Layer

The undercoat layer 2 is basically unnecessary in the present invention, but it can be provided in order to further improve the reliability, as needed. The undercoat layer 2 is composed of a layer containing a resin as a main component, a metal oxide film such as an alumite etc., and is used for the purpose of improving the adhesion between the electroconductive support and the charge transport layer, as well as for the purpose of controlling charge injected into the photosensitive layer. Examples of the resin material used for the undercoat layer include insulating polymers such as casein, polyvinyl alcohol, polyamide, melamine, cellulose; and electroconductive polymers such as polythiophene, polypyrrole, polyaniline. These resins can be used alone or mixed and used in an appropriate combination. Metal oxides such as titanium dioxide and zinc oxide can also be contained in these resins.

Photosensitive Layer

The single layer type photosensitive layer 3 is mainly composed of a charge generation material, a hole transport material, an electron transport material and a binder resin. Here, the single layer type photosensitive layer 3 may be formed on the outer periphery of the electrophotographic photoconductor farthest from the electroconductive support 1. The electrophotographic photoconductor may be mounted

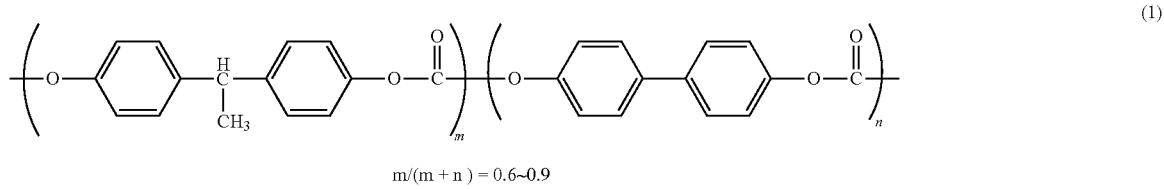

$$m/(m+n) = 0.6 \sim 0.9 \quad (1)$$

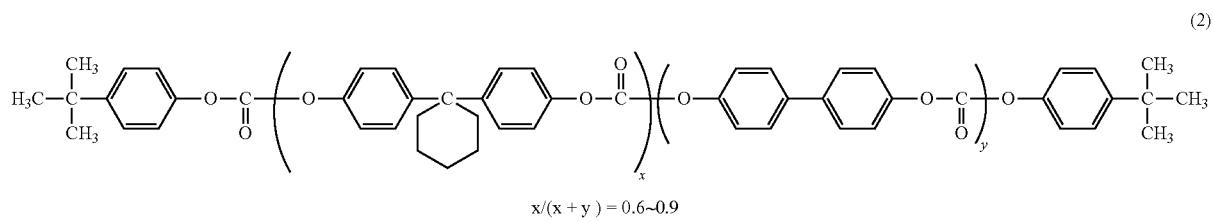

$$x/(x+y) = 0.6 \sim 0.9 \quad (2)$$

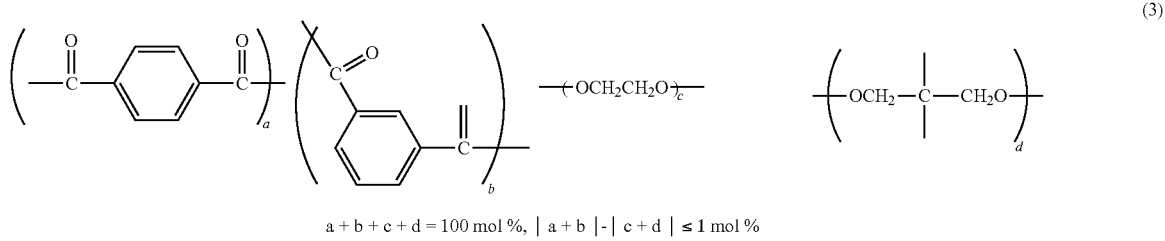

$$a+b+c+d = 100 \text{ mol \%}, \; |a+b|-|c+d| \leq 1 \text{ mol \%} \quad (3)$$

Single Layer Type Photoconductor

Electroconductive Support

The electroconductive support 1 plays a role as an electrode of a photoconductor and at the same time it serves as a support for respective layer constituting the photoconductor. The electroconductive support 1 may be in any shape such as a cylindrical shape, a plate shape, a film shape and the like, and in terms of material, in addition to metals such as aluminum, stainless steel, and nickel, a glass and a resin having electroconductively-treated surface may also be used.

on the electrophotographic apparatus in a state where the surface of the photosensitive layer 3 farthest from the electroconductive support 1 may come into contact with the atmosphere.

Charge Generation Material

As the charge generation material, X-type metal-free phthalocyanine may be used alone, or α-type titanyl phthalocyanine, β-type titanyl phthalocyanine, Y-type titanyl phthalocyanine, γ-type titanyl phthalocyanine, amorphous-type titanyl phthalocyanine, gallium phthalocyanine may be used alone or in an appropriate combination thereof. It is possible to select a suitable material according to the light wavelength region of the exposure light source used for image formation. Titanyl phthalocyanine with high quantum efficiency is optimal from the viewpoint of improved sensitivity.

Hole Transport Material

As a hole transport material, various hydrazone compounds, styryl compounds, stilbene compounds, enamine compounds, diamine compounds, butadiene compounds, indole compounds, triphenylamine compounds, triphenyldiamine compounds and the like can be used alone or in an appropriate combination. Among them, a styryl compound containing a triphenylamine skeleton is preferable from the viewpoint of cost and performance.

Electron Transport Material

As electron transport materials, those having higher mobility is more preferred. A quinone type material such as benzoquinone, stilbenequinone, naphthoquinone, dinaphthoquinone, diphenoquinone, phenanthrenequinone, azoquinone, or a tetranaphthalenecarboxylic acid diimide type material are preferred. From the viewpoint of injectability into the charge transport layer and compatibility with the binder resin, it is also preferable to use a material alone or two or more materials to increase the content of the electron transport material while suppressing the precipitation.

Binder Resin

As described above, as the binder resin, various kinds of polycarbonate-based resins as an essential component, and arbitrary resins selected from polystyrene-based resins, polyester-based resins, polyarylate-based resins and the like are appropriately used in a combination in order to control the water vapor permeability.

Other Additives

In the photosensitive layer 3, a deterioration inhibitor such as an antioxidant or a light stabilizer may be incorporated for the purpose of improving environmental resistance and stability against harmful light, if desired. Examples of the compounds used for such purposes include chromanol derivatives such as tocopherol and esterified compounds, polyarylalkane compounds, hydroquinone derivatives, etherified compounds, dietherified compounds, benzophenone derivatives, benzotriazole derivatives, thioether compounds, phenylenediamine derivatives, phosphonic acid esters, phosphorous acid esters, phenol compounds, hindered phenol compounds, amine compounds and the like.

A leveling agent such as a silicone oil or a fluorine-based oil may be contained for the purpose of improving the leveling property of the formed film and imparting lubricity. Further, for the purpose of adjusting the film hardness, reducing the friction coefficient, imparting lubricity, etc., a metal oxide such as silicon oxide (silica), titanium oxide, zinc oxide, calcium oxide, aluminum oxide (alumina), zirconium oxide; metal sulfates such as barium sulfate and calcium sulfate; and metal nitrides such as silicon nitride and aluminum nitride, in the form of fine particles, may be contained. Further, other known additives may be contained, if necessary, so long as electrophotographic characteristics may not be significantly impaired.

Composition

The mass ratio of the total functional materials (charge generation material, electron transport material and hole transport material) to the binder resin in the photosensitive layer 3 is preferably set in the range from 45:55 to 55:45 in order to obtain desired characteristics. When the mass ratio of the functional material is more than 55% by mass in the photosensitive layer, in other words, when the amount of the binder resin is less than 45% by mass, the amount of film reduction will be increased and the durability will be decreased, and the glass transition point will be decreased, resulting in insufficient creep strength. Accordingly, toner filming as well as filming of external additives and paper powder are liable to occur, and the amount of the generated minute black spots and the like due to deposited mixture of toner and paper powder in a high-temperature and high-humidity environment like the present example may be increased. In addition, contact member contamination (creep deformation) tends to occur easily, and contamination due to oil and fat such as grease and sebum contamination may also be worsened. When the mass ratio of the functional material is less than 45% by mass in the photosensitive layer 3, that is, when the content of the binder resin exceeds 55% by mass, it is difficult to obtain desired sensitivity characteristics, which may be unsuitable for practical use. Generally, from the viewpoint of suppressing member contamination, oil and fat contamination and sebum contamination while ensuring durability, it is desirable to increase the percentage of the binder resin.

The content ratio of the charge generation material is preferably from 0.5 to 3% by mass, more preferably from 0.8 to 1.8% by mass, of the entire film. When the amount of the charge generation material is too small, the sensitivity characteristics become insufficient, and the occurrence of interference fringes increases. On the other hand, when the amount of the charge generation material is too much, the charging characteristics and fatigue characteristics (stability in repeated use) tend to be insufficient.

The mass ratio of the electron transport material to the hole transport material may vary within the range of 1:1 to 1:4, but it is generally more preferable to use the materials in the range of 2:3 to 1:3 from the viewpoint of sensitivity characteristics, charging characteristics and fatigue characteristics, based on transporting balance of holes and electrons.

Solvent

Examples of the solvent used for forming the photosensitive layer 3 include halogenated hydrocarbons such as dichloromethane, dichloroethane, chloroform, carbon tetrachloride, chlorobenzene and the like; ethers such as dimethyl ether, diethyl ether, tetrahydrofuran, dioxane, dioxolane, ethylene glycol dimethyl ether, diethylene glycol dimethyl ether; ketones such as acetone, methyl ethyl ketone, cyclohexanone, which may be appropriately selected from the viewpoints of solubility, liquid stability and coatability of the respective materials.

Film Thickness

The film thickness of the photosensitive layer 3 is preferably in the range from 15 to 40 µm, more preferably 20 to 35 µm, still more preferably 25 to 30 µm from the viewpoint of ensuring practically effective performance.

Laminate Type Photoconductor

Electroconductive Support

The electroconductive support 1 is similar to the one for the single-layer type photoconductor.

Undercoat Layer

Also, an undercoat layer 2 is similar to the one for the single-layer type photoconductor and is basically unnecessary in the present invention, but, in order to improve the reliability, it may be appropriately provided as necessary.

Charge Transport Layer

The charge transport layer 4 is mainly composed of a hole transport material and a binder resin.

Hole Transport Material

The hole transport material used for the charge transport layer 4 is similar to the one for the single layer type photoconductor, but from the viewpoint of smooth charge transfer from the charge generation layer 5 to the charge transport layer 4, it is desirable to use the same material as that contained in the charge generation layer 5.

Binder Resin

As the binder resin of the charge transport layer 4, the same one as in the single layer type can be used. Since it is an inner layer, mechanical strength is not required so much, rather it is required to be hardly eluted when the charge generation layer 5 is applied. From such viewpoints, a resin which is hardly eluted in the solvent of the coating liquid for forming the charge generation layer 5 is preferable, and such a resin having a high molecular weight is preferably used. In relation to the binder resin of the charge generation layer 5, the water vapor permeability of the binder resin of the charge transport layer 4 is preferably lower than the water vapor transmission rate of the binder resin of the charge generation layer 5. Since deterioration easily occurs when the discharge produced gas enters the charge transport layer 4, suppressing the water vapor permeability of the charge transport layer 4 to a lower level is effective in preventing deterioration. Specifically, the water vapor permeability of the binder resin of the charge transport layer 4 is preferably 4 g/m$^2$·day or less, more preferably 3 g/m$^2$·day or less.

Other Additives

In the charge transport layer 4, a deterioration inhibitor such as an antioxidant or a light stabilizer may be incorporated for the purpose of improving environmental resistance and stability against harmful light, if desired. As compounds used for such a purpose, the same compounds as those mentioned for the single layer type photosensitive layer can be used.

Furthermore, in the charge transport layer 4, similar to the single layer type photosensitive layer, a leveling agent such as a silicone oil or a fluorine-based oil may be contained for the purpose of improving the leveling property of the formed film and imparting lubricity. Further, for the purpose of adjusting the film hardness, reducing the friction coefficient, imparting lubricity, and the like, fine particles of various metal oxides, metal sulfates, metal nitrides similar to those mentioned for the single layer type photosensitive layer may be contained. Further, other known additives may be contained so long as electrophotographic characteristics may not be significantly impaired, if necessary.

Composition

The mass ratio of the hole transport material and the binder resin in the charge transport layer 4 is in the range from 1:3 to 3:1 (25:75 to 75:25), suitably 7:13 to 13:7 (35:65 to 65:35). When the content of the hole transport material is less than 25% by mass in the charge transport layer 4, the transport function generally becomes insufficient, the residual potential becomes high, the environment dependency of the potential of the exposed portion in the device becomes large. Thus, the environmental stability of the image quality deteriorates so that it might become unsuitable for use. On the other hand, when the content of the hole transport material exceeds 75% by mass in the charge transport layer 4, that is, when the binder resin is less than 25% by mass in the charge transport layer 4, harmful effects of elution might occur when the charge generation layer 5 is applied.

Solvent

Examples of a solvent used for forming the charge transport layer 4 include halogenated hydrocarbons such as dichloromethane, dichloroethane, chloroform, carbon tetrachloride, chlorobenzene and the like; ethers such as dimethyl ether, diethyl ether, tetrahydrofuran, dioxane, dioxolane, ethylene glycol dimethyl ether, diethylene glycol dimethyl ether; ketones such as acetone, methyl ethyl ketone, cyclohexanone, which may be appropriately selected from the viewpoints of solubility, liquid stability and coatability of the respective materials.

Film Thickness

The film thickness of the charge transport layer 4 is determined considering the charge generation layer 5 described below and is preferably in the range from 3 to 40 μm, more preferably 5 to 30 μm, and still more preferably 7 to 20 μm, from the viewpoint of ensuring practically effective performance.

Charge Generation Layer

The charge generation layer 5 is formed by a method such as applying a coating liquid in which particles of a charge generation material are dispersed in a binder resin in which a hole transport material and an electron transport material are dissolved. The charge generation layer 5 has a function of accepting light to generate carriers and of carrying the generated electrons to the surface of the photoconductor as well as a function of transporting holes to the charge transport layer 4. The charge generation layer 5 should have high carrier generation efficiency and at the same time injectability of the generated holes into the charge transport layer 4 is important, and it is desirable that the electric field dependence is small and the injection is good even in a low electric field. Here, the charge generation layer 5 may be formed on the outer periphery of the electrophotographic photoconductor farthest from the electroconductive support 1. The charge transport layer 4 may be formed between the charge generation layer 5 and the electroconductive support 1. The electrophotographic photoconductor may be mounted on the electrophotographic apparatus in a state where the surface of the charge generation layer 5 farthest from the electroconductive support 1 may come into contact with the atmosphere.

Charge Generation Material

As the charge generation material, the same material as that for the single layer type photoconductor can be used, and a suitable material can be selected according to the light wavelength region of the exposure light source used for image formation. Titanyl phthalocyanine with high quantum efficiency is optimal from the viewpoint of improved sensitivity.

Hole Transport Material

It is preferable that a hole transport material has a small difference in ionization potential from that of the hole transport material of the charge transport layer 4 in view of the necessity of injecting holes into the charge transport layer 4. Specifically, the difference is preferably 0.5 eV or less. In particular, in the present invention, the charge generation layer 5 is applied and formed on the charge transport layer 4. Therefore, it is preferable that the hole transport material contained in the charge transport layer 4 is also contained in the charge generation layer 5, and it is more preferable that the same hole transport material is used for the charge transport layer 4 and the charge generation layer 5, in order to stabilize the liquid state of the charge generation layer 5 by suppressing the influence of elution of the charge transport layer 4 into the coating liquid at the time of applying the charge generation layer 5.

Electron Transport Material

The same electron transport material as that for the single layer type photoconductor can be used, and the material having higher mobility shall be more preferable. From the viewpoint of injectability into the charge transport layer 4 and compatibility with the binder resin, however, it is also preferable to use a material alone or two or more materials to increase the content of the electron transport material while suppressing the precipitation.

Binder Resin

Similar to the case of the single layer type photoconductor, as the binder resin of the charge generation layer 5, various kinds of polycarbonate-based resins as an essential component, and arbitrary resins selected from polystyrene-based resins, polyester-based resins, polyarylate-based resins and the like are appropriately used in a combination in order to control the water vapor permeability. In particular, similar to the aforementioned hole transport material, it is preferable that the binder resin contained in the charge transport layer 4 is also contained in the charge generation layer 5, and it is more preferable that the same binder resin is used for the charge transport layer 4 and the charge generation layer 5, in order to stabilize the liquid state of the charge generation layer 5 by suppressing the influence of elution of the charge transport layer 4 into the coating liquid at the time of applying the charge generation layer 5.

Other Additives

In the charge generation layer 5, a deterioration inhibitor such as an antioxidant or a light stabilizer may be incorporated for the purpose of improving environmental resistance and stability against harmful light, if desired. As the compound used for such a purpose, the same compounds as those mentioned for the single layer type photosensitive layer can be used.

Furthermore, in the charge generation layer 5, similar to the single layer type photosensitive layer, a leveling agent such as a silicone oil or a fluorine-based oil may be contained for the purpose of improving the leveling property of the formed film and imparting lubricity. Further, for the purpose of adjusting the film hardness, reducing the friction coefficient, imparting lubricity, and the like, fine particles of various metal oxides, metal sulfates, metal nitrides similar to those mentioned for the single layer type photosensitive layer may be contained. Furthermore, other known additives may be contained so long as electrophotographic characteristics may not be significantly impaired, if necessary.

Composition

The compounding amount of the respective functional materials (charge generation material, electron transport material and hole transport material) in the charge generation layer 5 is set as follows. First, in the present invention, it is preferable that the content of the charge generation material in the charge generation layer 5 is 1 to 3.0% by mass, particularly 1.5 to 2.5% by mass. Furthermore, the mass ratio of the total functional materials (the charge generation material, the electron transport material and the hole transport material) in the charge generation layer 5 to the binder resin is, similar to the case of the single layer type photoconductor, set in the range from 35:65 to 65:35 in order to obtain the desired properties. However, when the mass ratio of the functional material is more than 65% by mass in the charge generation layer 5, in other words, when the amount of the binder resin is less than 35% by mass, the amount of film reduction will be increased and the durability will be decreased, and the glass transition point will be decreased, resulting in insufficient creep strength. Accordingly, toner filming as well as filming of external additives and paper powder are liable to occur, and the amount of the generated minute black spots and the like due to deposited mixture of toner and paper powder in a high-temperature and high-humidity environment like in the present example may be increased. In addition, contact member contamination (creep deformation) tends to occur easily, and potential contamination due to oil and fat such as grease and sebum contamination may also be worsened. When the mass ratio of the functional material is less than 35% by mass in the charge generation layer 5, that is, when the content of the binder resin exceeds 65% by mass, it is difficult to obtain desired sensitivity characteristics, becoming unsuitable for practical use. Generally, from the viewpoint of suppressing member contamination, oil contamination and sebum contamination while ensuring durability, it is desirable to increase the percentage of the binder resin.

The mass ratio of the electron transport material to the hole transport material may vary within the range from 1:5 to 5:1. In the present invention, however, since there exists a charge transport layer 4 having a hole transporting function as an underlayer of the charge generation layer 5, the range is suitably from 5:1 to 4:2, particularly preferably 4:1 to 3:2 considering overall properties, contrary to the range from 1:5 to 2:4 for the hole transport material-rich composition, which is the general mass ratio range in the single layer type organic photoconductor. As described above, in the laminate type photoconductor of the present invention, a large amount of hole transport material can be compounded in the charge transport layer 4 as an underlayer. Accordingly, unlike the single layer type photoconductor, in the charge generation layer 5 as an upper layer, the content of the hole transport material which is one factor of the occurrence of cracks due to adhesion of sebum can be kept low.

Solvent

Examples of the solvent used for forming the charge generation layer 5 include halogenated hydrocarbons such as dichloromethane, dichloroethane, chloroform, carbon tetrachloride, chlorobenzene and the like; ethers such as dimethyl ether, diethyl ether, tetrahydrofuran, dioxane, dioxolane, ethylene glycol dimethyl ether, diethylene glycol dimethyl ether; ketones such as acetone, methyl ethyl ketone, cyclohexanone. Among them, those having a high boiling point are generally preferred. Specifically, those having a boiling point of 60° C. or higher, particularly those having a boiling point of 80° C. or higher are preferably used. Particularly, when titanyl phthalocyanine having high quantum efficiency is used for a charge generation material to improve sensitivity, it is preferable to use 1,2-dichloroethane having a specific gravity of 1 or more and a boiling point of 70° C. or more as a solvent to be used for forming a charge generation layer, in terms of dispersion stability and elution resistance of the charge transport layer.

Film Thickness

The film thickness of the charge generation layer 5 is determined considering the charge transport layer 4 and is preferably in the range from 3 to 40 μm, more preferably 5 to 30 μm, and still more preferably 10 to 18 μm from the viewpoint of ensuring practically effective performance.

Method of Manufacturing Photoconductor

In producing the photoconductor of the present invention, a layer containing a binder resin having the water vapor permeability of 5 to 13 g/m²·day is formed by dip coating method. By using the dip coating method, it is possible to produce a photoconductor having good appearance quality and stable electric characteristics, while ensuring low cost and high productivity. The layer containing the binder resin having the water vapor permeability in the range from 5 to 13 g/m²·day is a single layer type photosensitive layer 3 in the case of a single layer type photoconductor, and is the charge generation layer 5 in the case of a laminate type photoconductor. In producing the photoconductor of the present invention, there is no particular limitation except for using the dip coating method, and it can be carried out according to a conventional method.

Electrophotographic Apparatus

The electrophotographic apparatus of the present invention comprises the above-mentioned photoconductor mounted thereon. In particular, it is suitably applied to a high-quality/high-speed monochrome machine or a tandem color machine equipped with a cleaner-less process of a nonmagnetic one-component contact developing system using polymerized toner.

Specifically, it is based on a noncontact charging type charging process using a scorotron, a nonmagnetic one-component contact developing system using a suspension polymerized toner and has a high transfer efficiency. Therefore, it is suitable as an electrophotographic apparatus using a process in which only paper powder is collected in a paper powder collecting section and the untransferred toner is collected in a developing section. In this case, since there is no rubbing member for updating the surface of the photosensitive layer, the amount of wear of the photosensitive layer is small. Particularly, in this process, materials having no charge are difficult to remove once they attached, and when the mixture of toner and paper powder adheres to the surface of the photosensitive layer in a high-temperature and high-humidity environment, the mixture tends to firmly deposited.

Figure 3:
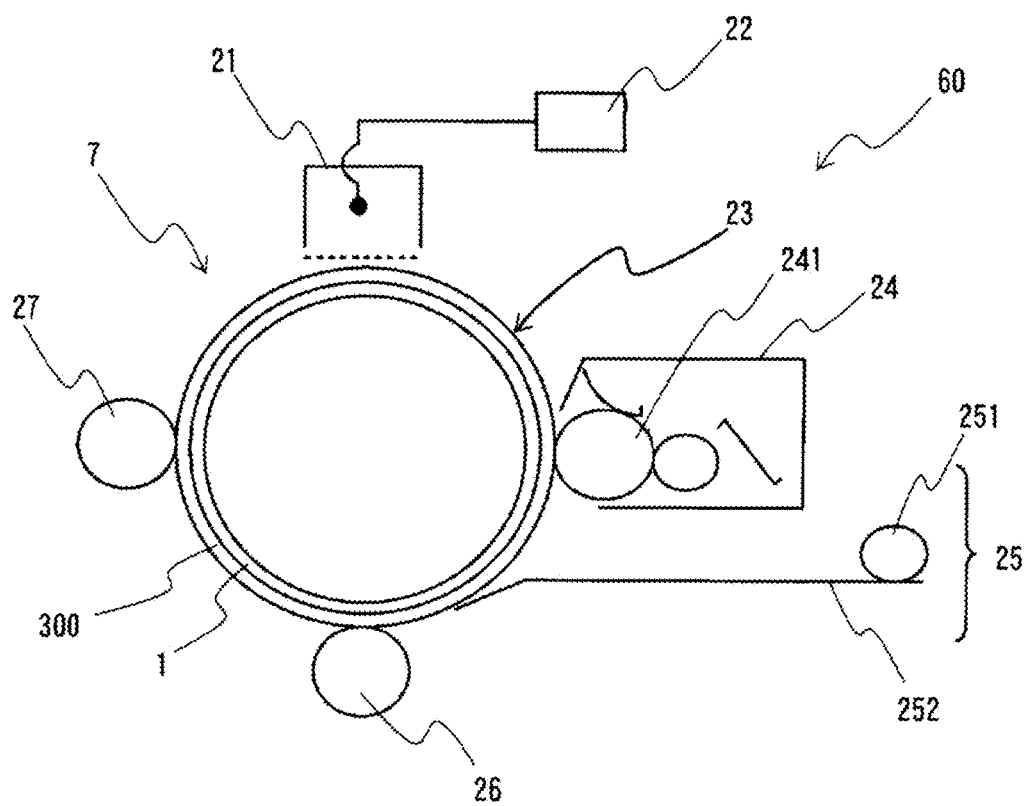
FIG. 3 is a schematic configuration diagram showing an example of an electrophotographic apparatus of the present invention.
Figure 4:
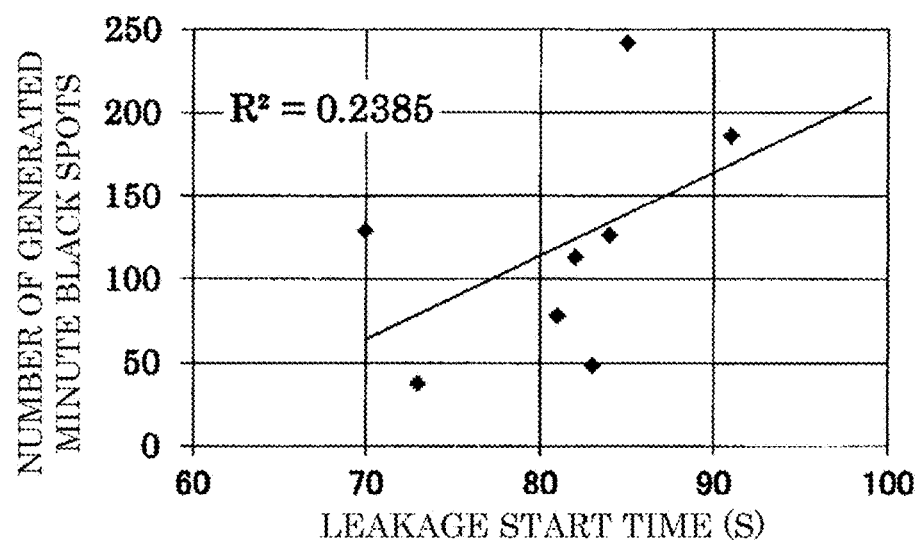
FIG. 4 is a graph showing the relationship between the leakage start time and the number of the generated minute black spots.

As an example, FIG. 3 shows a schematic configuration diagram of an example of the electrophotographic apparatus of the present invention. The illustrated electrophotographic apparatus 60 is equipped with an electrophotographic photoconductor 7 including an electroconductive support 1 and a photosensitive layer 300 coated on the outer periphery thereof. More specifically, the illustrated electrophotographic apparatus 60 includes a charger 21 such as a roller charging member; a high voltage power supply 22 for supplying an applied voltage to the charger 21; an image exposure member 23; an image developing device 24 including a developing roller 241; a paper feeding member 25 including a paper feeding roller 251 and a paper feeding guide 252; a transfer charger (direct charging type) 26; and a paper dust collection unit 27, disposed at the outer peripheral edge of the photoconductor 7. It may also be a color printer.

EXAMPLES

Hereinafter, the specific aspects of the present invention will be described in more detail using Examples. The present invention is not limited to the following examples so long as it is not deviated from the spirit of the present invention.

Preparation Example of Electrophotographic Photoconductor

As the electroconductive support, a tube made of aluminum having thickness of 0.75 mm, cut into two shapes was used: φ30 mm×length 244.5 mm and φ30 mm×length 254.4 mm having surface roughness (Rmax) of 0.2 μm.

Materials Used

Charge Generation Material

As the charge generation material, titanyl phthalocyanine G1 represented by the following structural formula was used:

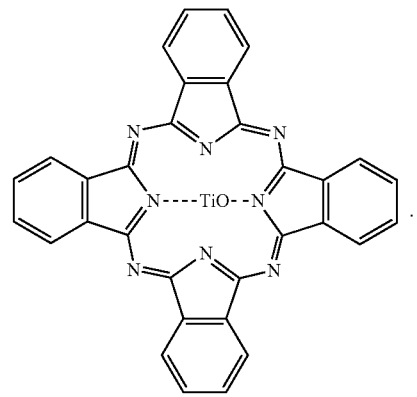

G1

Hole Transport Material

As the hole transport material, the following compounds H1, H2 and H3 were used:

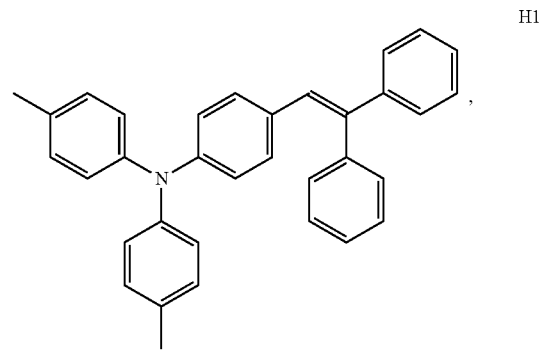

H1

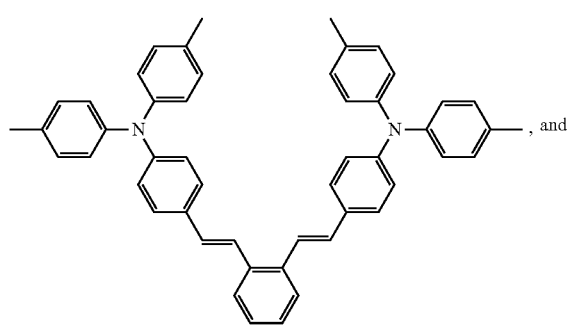

H2, and

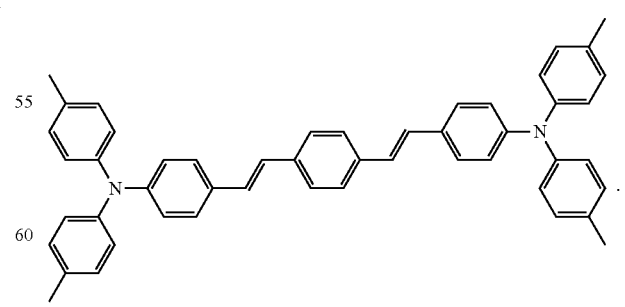

H3

Electron Transport Material

As the electron transport material, the following compounds E1, E2 and E3 were used:

E1

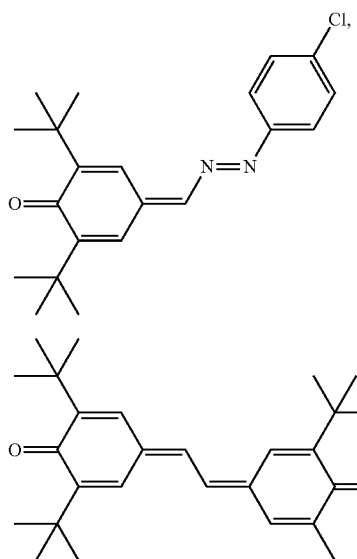

E2

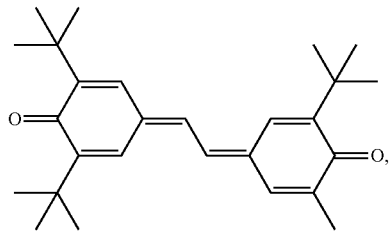

and

-continued

E3

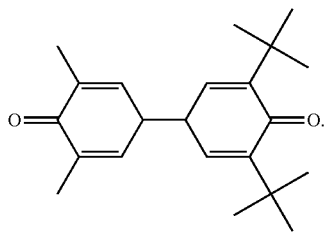

Binder Resin

As the binder resin, polycarbonate-based resins B1 to B6 each having a repeating unit represented by the following formulae were used:

B1: Polycarbonate-based resin (water vapor permeability: 9.12 g/m²·day)

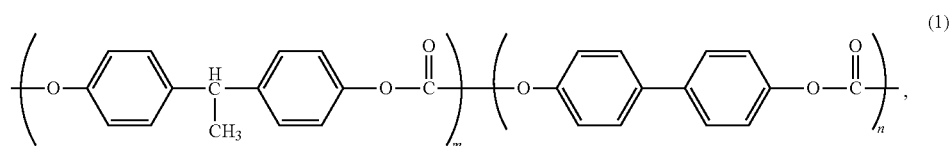

$m/(m + n) = 0.85$

B2: Polycarbonate-based resin (water vapor permeability: 6.08 g/m²·day)

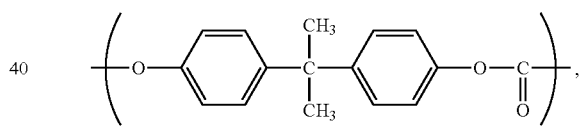

B3: Polycarbonate-based resin (water vapor permeability: 6.02 g/m²·day)

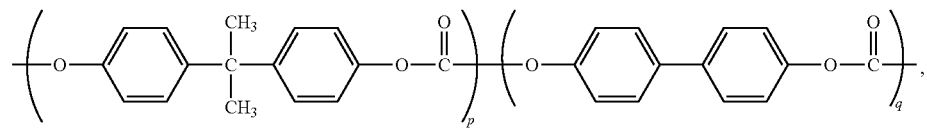

$p/(p + q) = 0.85$

B4: Polycarbonate-based resin (water vapor permeability: 2.08 g/m²·day)

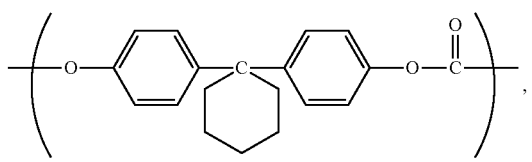

B5: Polycarbonate-based resin (water vapor permeability: 2.02 g/m²·day)

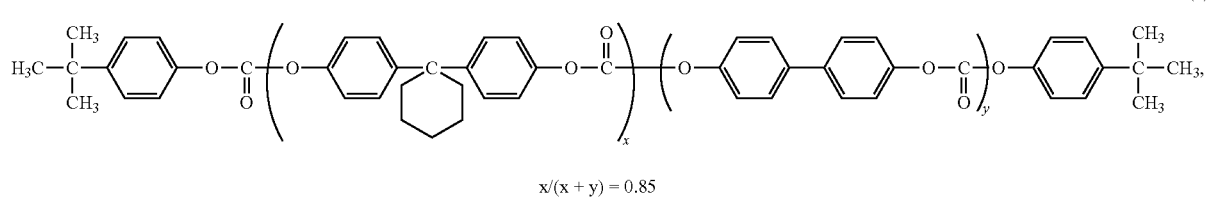

$$x/(x+y) = 0.85 \quad (2)$$

and
B6: Polycarbonate-based resin (water vapor permeability: 1.96 g/m²·day)

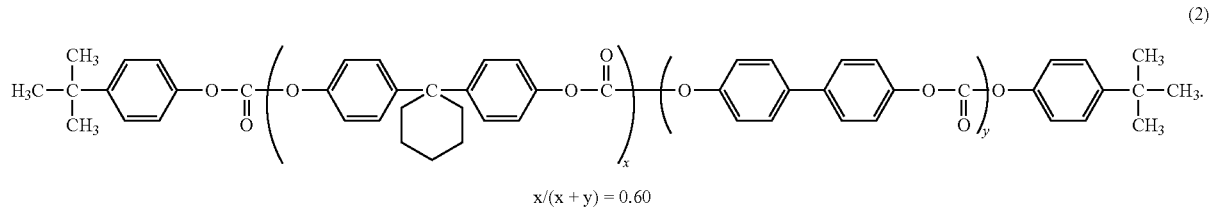

$$x/(x+y) = 0.60 \quad (2)$$

Further, as the binder resin, the following resins B7 to B10 were also used as arbitrary resins to be used in combination with any of the polycarbonate-based resins B1 to B6:

B7: General purpose polystyrene resin GPPS manufactured by Toyo Engineering Corporation (water vapor permeability: 30.0 g/m²·day), B8: General purpose polymeric polystyrene resin VYLON 290 manufactured by TOYOBO CO., LTD. (water vapor permeability: 7.5 g/m²·day), B9: Polymeric polyester resin having the following repeating unit (water vapor permeability: 7.5 g/m²·day)

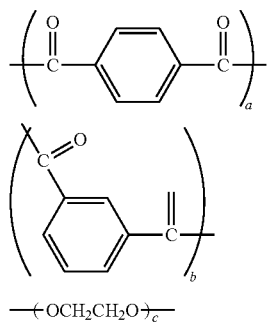

$a \approx b \approx c \approx d \approx 25$ mol % and

B10: General purpose polyarylate resin U Polymer manufactured by Unitika Ltd. (water vapor permeability: 12.1 g/m²·day).

Additives

As the antioxidant, a hindered phenol-based antioxidant, dibutylhydroxytoluene (BHT) was used.

As a lubricant, dimethyl silicone oil KF-54 manufactured by Shin-Etsu Chemical Co., Ltd. was used.

Solvent

As the solvent, tetrahydrofuran was used.

Preparation of Coating Liquid

Coating Liquid for Single Layer Type Photoconductor

The hole transport material, the electron transport material, the binder resin and the additive material were added at a predetermined mixing ratio to the container together with a solvent to dissolve. Next, the charge generation material weighed so as to have a predetermined mass ratio was added and dispersed with a Dyno-Mill (MULTILAB, manufactured by Shinmaru Enterprises Corporation) to prepare a coating liquid for a single layer type photoconductor.

The compositional ratio of the materials other than the binder resin are shown in the following Table 1. The content in the table is in % by mass.

TABLE 1

| Material Composition | Charge Generation Material | | Charge Transport Material | | Hole Transport Material | | Total Resin | Additive | |
|---|---|---|---|---|---|---|---|---|---|
| | Material | Content | Material | Content | Material | Content | | BHT | KF54 |
| Single layer GT1 | G1 | 1.8 | E3 | 10.8 | H3 | 32.3 | 55 | 0.1 | 0.1 |

TABLE 1-continued

| Material Composition | Charge Generation Material | | Charge Transport Material | | Hole Transport Material | | Total Resin | Additive | |
|---|---|---|---|---|---|---|---|---|---|
| | Material | Content | Material | Content | Material | Content | | BHT | KF54 |
| Single layer GT2 | G1 | 0.8 | E1 | 21.6 | H1 | 32.4 | 45 | 0.1 | 0.1 |
| Single layer GT3 | G1 | 1.3 | E2 | 15.8 | H2 | 32.7 | 50 | 0.1 | 0.1 |

Coating Liquid for Laminate Type Photoconductor

Coating Liquid for Charge Transport Layer

The hole transport material, the binder resin and the additive material were added at a predetermined mixing ratio to the container together with a solvent to dissolve. Thus, a coating liquid for a charge transport layer for a laminate type photoconductor was prepared.

The compositional ratio of the materials other than the binder resin are shown in the following Table 2. The content in the table is in % by mass. As the binder resin, the resin B5 was used.

TABLE 2

| Material Composition | Hole Transport Material | | Total Resin | Additive | |
|---|---|---|---|---|---|
| | Material | Content | | BHT | KF54 |
| Laminate CT1 | H1 | 64.8 | 35 | 0.1 | 0.1 |
| Laminate CT2 | H2 | 49.8 | 50 | 0.1 | 0.1 |
| Laminate CT3 | H3 | 34.8 | 65 | 0.1 | 0.1 |

Coating Liquid for Charge Generation Layer

The hole transport material, the electron transport material, the binder resin and the additive material were added at a predetermined mixing ratio to the container together with a solvent to dissolve. Next, the charge generation material weighed so as to have a predetermined weight ratio was added and dispersed with a Dyno-Mill (MULTILAB, manufactured by Shinmaru Enterprises Corporation) to prepare a coating liquid for a charge generation layer for a laminate type photoconductor.

The compositional ratio of the materials other than the binder resin are shown in the following Table 3. The content in the table is in % by mass.

TABLE 3

| Material Composition | Charge Generation Material | | Charge Transport Material | | Hole Transport Material | | Total Resin | Additive | |
|---|---|---|---|---|---|---|---|---|---|
| | Material | Content | Material | Content | Material | Content | | BHT | KF54 |
| Laminate G1 | G1 | 2.5 | E3 | 19.4 | H3 | 12.9 | 65 | 0.1 | 0.1 |
| Laminate G2 | G1 | 1.5 | E1 | 42.6 | H1 | 10.7 | 45 | 0.1 | 0.1 |
| Laminate G3 | G1 | 2.0 | E2 | 35.0 | H2 | 12.8 | 50 | 0.1 | 0.1 |

Preparation of Photoconductor

Single Layer Type Photoconductor

A coating liquid for single layer type photoconductor having material composition GT1 shown in Table 1 was dip coated on the above electroconductive support by changing the binder resin as shown in Tables 4 and 5 below and dried with hot air at 110° C. for 60 minutes to form single layer type photosensitive layers having a film thickness of 20 to 35 μm, respectively, thereby single layer type photoconductors were prepared. The thickness was 20 μm in Examples 1 to 10 and Comparative Examples 1 to 9; 27 μm in Examples 11 to 15 and Comparative Examples 10 and 11; and 35 μm in Examples 16 to 23 and Comparative Examples 12 to 15.

A coating liquid for single layer type photoconductor having material compositions GT2 and GT3 shown in the above Table 1 was dip coated on the above electroconductive substrate by changing the binder resin as shown in Examples 24 and 25 of Table 5 below and dried with hot air at 110° C. for 60 minutes to form single layer type photosensitive layers having a film thickness of 20 μm and 35 μm, respectively, thereby single layer type photoconductors were prepared.

Laminate Type Photoconductor

A coating liquid for charge transport layer having material composition CT1 shown in the above Table 2 was dip coated on the above electroconductive support and dried with hot air at 110° C. for 60 minutes to form three types of charge transport layers having a film thickness of 7 μm, 10 μm, and 20 μm, respectively. Next, a coating liquid for the charge generation layer having material composition G1 shown in the above Table 3 was dip coated by changing the binder resin as shown in Tables 6 and 7 below and dried with hot air at 110° C. for 60 minutes to form three types of charge generation layers having a film thickness of 13 μm, 17 μm, and 1 μm, respectively, thereby laminate type photoconductors having a total film thickness of 2 μm, 27 μm, and 35 μm, respectively, were prepared.

The thickness was 20 μm in Examples 26 to 35 and Comparative Examples 16 to 24; 27 μm in Examples 36 to 40 and Comparative Examples 25, 26; and 35 µm in Examples 41 to 48 and Comparative Examples 27 to 30.

A coating liquid for the charge transport layer of material composition CT1 shown in the above Table 2 was dip coated on the above electroconductive support and dried with hot air at 110° C. for 60 minutes to form charge transport layers having a film thickness of 7 µm and 20 µm, respectively. Subsequently, dip coating was conducted by using coating liquids for the charge generation layer having material compositions G2 and G3 in place of G1 shown in the above Table 3 and by changing the binder resin as shown in Example 49, Comparative Example 31 and Example 50, and Comparative Example 32 of Table 7 below, followed by hot air drying at 110° C. for 60 minutes to form charge generation layers having a film thickness of 1 µm and 15 µm, respectively, thereby laminate type photoconductors having a total film thickness of 20 µm and 35 µm, respectively, were prepared.

Further, the coating liquid for the charge transport layer of material compositions CT2, CT3 in place of CT1 shown in the above Table 2 was dip coated on the above electroconductive support and dried with hot air at 110° C. for 60 minutes to form charge transport layers having a film thickness of 7 µm and 20 µm, respectively. Subsequently, a coating liquid for the charge generation layer having material composition G1 shown in the above Table 3 was dip coated by changing the binder resin as shown in Examples 51 and 52 of the Table 7 below and dried with a hot air at 110° C. for 60 minutes to form charge generation layers having a film thickness of 13 µm and 15 µm, respectively, thereby laminate type photoconductors having a total film thickness of 20 µm and 35 µm, respectively, were prepared.

In addition, as a coating liquid for the charge transport layer, the binder resin in the material composition CT1 shown in the above Table 2, which was changed as shown in Example 53 of Table 8 below, was used and dip coated on the above electroconductive support and dried with hot air at 110° C. for 60 minutes to form a charge transport layer having a film thickness of 7 µm. Next, a coating liquid for the charge generation layer having material composition G1 shown in the above Table 3 was dip coated by changing the binder resin as shown in Example 53 of Table 8 below and dried with hot air at 110° C. for 60 minutes to form a charge generation layer having a film thickness of 13 µm, thereby a laminate type photoconductor having a total film thickness of 20 µm was prepared.

In addition, as a coating liquid for the charge transport layer, the binder resin in the material composition CT1 shown in the above Table 2, which was changed as shown in Example 54 of the Table 8 below, was used and dip coated on the above electroconductive support and dried with hot air at 110° C. for 60 minutes to form a charge transport layer having a film thickness of 20 µm. Next, a coating liquid for the charge generation layer having material composition G3 shown in the above Table 3 was coated by dip coating by changing the binder resin as shown in Example 54 of the Table 8 below and dried with hot air at 110° C. for 60 minutes to form a charge generation layer having a film thickness of 15 µm, thereby a laminate type photoconductor having a total film thickness of 35 µm was prepared.

In addition, as a coating liquid for the charge transport layer, the binder resin in the material composition CT2 shown in the above Table 2 which was changed as shown in Example 55 of the Table 8 below, was used and dip coated on the above electroconductive support and dried with hot air at 110° C. for 60 minutes to form a charge transport layer having a film thickness of 10 µm. Next, a coating liquid for the charge generation layer having material composition G1 shown in the above Table 3 was dip coated by changing the binder resin as shown in Example 55 of the Table 8 below and dried with hot air at 110° C. for 60 minutes to form a charge generation layer having a film thickness of 17 µm, thereby a laminate type photoconductor having a total film thickness of 27 µm was prepared.

In addition, as a coating liquid for the charge transport layer, the binder resin in the material composition CT3 shown in the above Table 2, which was changed as shown in Examples 56 and 57 in the Table 8 below, was used and dip coated on the above electroconductive support and dried with hot air at 110° C. for 60 minutes to form a charge transport layer having a film thickness of 10 µm. Next, a coating liquid for the charge generation layer having material composition G1 shown in the above Table 3 was dip coated by changing the binder resin as shown in Examples 56 and 57 in the Table 8 below and dried with hot air at 110° C. for 60 minutes to form a charge generation layer having a film thickness of 17 µm, thereby a laminate type photoconductor having a total film thickness of 27 µm was prepared.

Evaluation Method of Photoconductor

For the photoconductor having a shape of φ30 mm×length 244.5 mm, intermittent printing was conducted with a commercially available a 50-sheet monochrome high-speed laser printer (HL-6400DW) manufactured by Brother Industries, Ltd. in an environment of 32° C. and 80% RH at 10-second interval to provide an image with a print area ratio of 4% at 5000 sheets/day up to 60,000 sheets. Early in the next morning, the generation of minute black spots on the white paper (the state of toner/paper powder deposited on paper powder) was checked.

For the photoconductor having a shape of φ30 mm×length 254.4 mm, intermittent printing was conducted with a commercially available a 22-sheet tandem color LED printer (HL-3170CDW) manufactured by Brother Industries, Ltd. under environment of 32° C. and 80% RH at 10-second interval to provide an image with a print area ratio of 4% at 3,000 sheets/day up to 15,000 sheets. Early in the next morning, the generation of color spots on the white paper (the state of toner/paper powder fixed on paper powder) was checked.

Evaluation Items for Photoconductor

Evaluation of Water Vapor Permeability of Resin

According to JIS 7129: 2008, the low humidity chamber and the high humidity chamber were sectioned with a test piece and the absolute amount of water vapor permeated after standing for 1 day was detected by gas chromatography.

Evaluation of Generation of Black Spots or Color Spots

Minute black spots or color spots (having a diameter of about 0.5 mm or less) in the blank portion were measured for the number generated in the photoconductor cycle. The results were evaluated in three-grade as follows:

○: 5 or less; Δ: 6 to 20; x: 21 or more.

Evaluation of Generation of Deposited Matter

The number of the deposited matters of the mixture of toner and paper powder on the surface of the photoconductor was measured and evaluated in 3-grade:

○: 5 or less; Δ: 6 to 20; x: 21 or more.

These results are also shown in Tables 4 to 7 below.

Evaluation of Ghost/Fog

Figure 5:
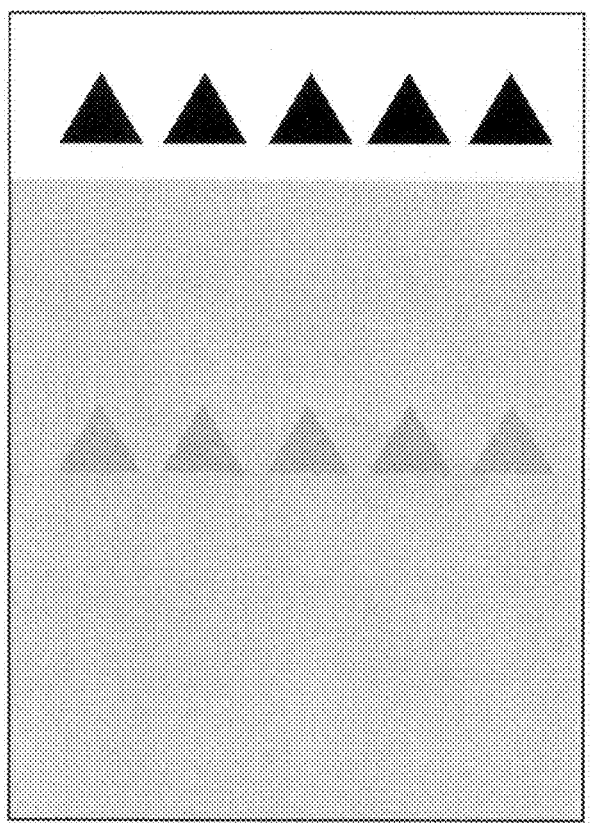
FIG. 5 is an explanatory view showing an evaluation image used for evaluating ghost/fog in Examples.

With respect to the photoconductors of Examples 1 and 53 to 57, at the start of printing on the first day, three sheets of white solid and three sheets of images shown in FIG. 5 were printed, and the following ghost/fogging evaluation was performed. The image in FIG. 5 is image for ghost evaluation, a 600 dpi image, in which a solid image of ▲ (filled triangle) is arranged in the lateral direction in the upper solid white image and a dotted image of one dot and two spaces: halftone (H/T) are arranged. The ghost image in this case means that a portion having a density darker than the peripheral portion occurs in the form of Δ on the H/T image.

Regarding ghosts, the difference in density was visually evaluated in 3-grade based on the following criteria:

○: indistinguishable; Δ: slightly distinguishable; x: clearly distinguishable.

Regarding fogs, the difference in fog of white solid was visually evaluated in 3-grade based on the following criteria:

○: unobservable; Δ: slightly observable; x: clearly observable.

These results are also shown in the Table 8 below.

TABLE 4

| | First Binder Resin | | Second Binder Resin | | | Monochrome Machine | | Color Machine | |
|---|---|---|---|---|---|---|---|---|---|
| | Material | Content (% by mass) | Material | Content (% by mass) | Water Vapor Permeability (g/m² · day) | Paper Powder/Toner Deposition | Black Spot | Paper Powder/Toner Deposition | Color Spot |
| Example 1 | B1 | 100.0 | — | — | 9.12 | ○ | ○ | ○ | ○ |
| Example 2 | B2 | 100.0 | — | — | 6.08 | ○ | ○ | ○ | ○ |
| Example 3 | B3 | 100.0 | — | — | 6.02 | ○ | ○ | ○ | ○ |
| Comparative Example 1 | B4 | 100.0 | — | — | 2.08 | X | X | X | X |
| Comparative Example 2 | B5 | 100.0 | — | — | 2.02 | X | X | X | X |
| Comparative Example 3 | B6 | 100.0 | — | — | 1.96 | X | X | X | X |
| Comparative Example 4 | B7 | 100.0 | — | — | 30 | X | X | X | X |
| Comparative Example 5 | B8 | 100.0 | — | — | 7.5 | X | X | X | X |
| Comparative Example 6 | B9 | 100.0 | — | — | 7.5 | X | X | X | X |
| Comparative Example 7 | B10 | 100.0 | — | — | 12.1 | X | X | X | X |
| Example 4 | B1 | 69.4 | B10 | 30.6 | 10 | ○ | ○ | ○ | ○ |
| Example 5 | B1 | 34.7 | B10 | 65.3 | 11 | ○ | ○ | ○ | ○ |
| Comparative Example 8 | B1 | 76.6 | B7 | 23.4 | 14 | Δ | X | Δ | X |
| Example 6 | B1 | 63.2 | B2 | 36.8 | 8 | ○ | ○ | ○ | ○ |
| Example 7 | B1 | 30.9 | B8 | 69.1 | 8 | ○ | ○ | ○ | ○ |
| Example 8 | B1 | 55.7 | B4 | 44.3 | 6 | ○ | ○ | ○ | ○ |
| Example 9 | B1 | 56.1 | B5 | 43.9 | 6 | ○ | ○ | ○ | ○ |
| Example 10 | B1 | 42.5 | B6 | 57.5 | 5 | Δ | Δ | Δ | Δ |
| Comparative Example 9 | B1 | 34.4 | B4 | 65.6 | 4.5 | X | X | X | X |
| Comparative Example 10 | B4 | 91.3 | B7 | 8.7 | 4.5 | X | X | X | X |
| Example 11 | B4 | 89.5 | B7 | 10.5 | 5 | Δ | Δ | Δ | Δ |

TABLE 5

| | First Binder Resin | | Second Binder Resin | | | Monochrome Machine | | Color Machine | |
|---|---|---|---|---|---|---|---|---|---|
| | Material | Content (% by mass) | Material | Content (% by mass) | Water Vapor Permeability (g/m² · day) | Paper Powder/Toner Deposition | Black Spot | Paper Powder/Toner Deposition | Color Spot |
| Example 12 | B4 | 60.9 | B7 | 39.1 | 13 | Δ | Δ | Δ | Δ |
| Comparative Example 11 | B4 | 57.3 | B7 | 42.7 | 14 | X | X | X | X |
| Example 13 | B4 | 46.1 | B8 | 53.9 | 5 | Δ | Δ | Δ | Δ |
| Example 14 | B4 | 27.7 | B9 | 72.3 | 6 | ○ | ○ | ○ | ○ |
| Example 15 | B4 | 70.6 | B10 | 29.4 | 5 | Δ | Δ | Δ | Δ |
| Comparative Example 12 | B5 | 91.1 | B7 | 8.9 | 4.5 | X | X | X | X |
| Example 16 | B5 | 89.3 | B7 | 10.7 | 5 | Δ | Δ | Δ | Δ |
| Comparative Example 13 | B5 | 57.2 | B7 | 42.8 | 14 | Δ | X | Δ | X |
| Example 17 | B5 | 45.6 | B8 | 54.4 | 5 | Δ | Δ | Δ | Δ |
| Example 18 | B5 | 27.4 | B9 | 72.6 | 6 | ○ | ○ | ○ | ○ |
| Example 19 | B5 | 70.1 | B10 | 29.9 | 5 | Δ | Δ | Δ | Δ |
| Comparative Example 14 | B6 | 90.9 | B7 | 9.1 | 4.5 | X | X | X | X |
| Example 20 | B6 | 89.2 | B7 | 10.8 | 5 | Δ | Δ | Δ | Δ |
| Comparative Example 15 | B6 | 55.3 | B7 | 44.7 | 14.5 | X | X | X | X |

TABLE 5-continued

| | First Binder Resin | | Second Binder Resin | | | Monochrome Machine | | Color Machine | |
|---|---|---|---|---|---|---|---|---|---|
| | Material | Content (% by mass) | Material | Content (% by mass) | Water Vapor Permeability (g/m² · day) | Paper Powder/Toner Deposition | Black Spot | Paper Powder/Toner Deposition | Color Spot |
| Example 21 | B6 | 45.1 | B9 | 54.9 | 5 | Δ | Δ | Δ | Δ |
| Example 22 | B6 | 27.1 | B9 | 72.9 | 6 | ○ | ○ | ○ | ○ |
| Example 23 | B6 | 69.7 | B10 | 30.3 | 5 | Δ | Δ | Δ | Δ |
| Example 24 | B1 | 100.0 | — | — | 9.12 | ○ | ○ | ○ | ○ |
| Example 25 | B1 | 100.0 | — | — | 9.12 | ○ | ○ | ○ | ○ |

TABLE 6

| | First Binder Resin | | Second Binder Resin | | | Monochrome Machine | | Color Machine | |
|---|---|---|---|---|---|---|---|---|---|
| | Material | Content (% by mass) | Material | Content (% by mass) | Water Vapor Permeability (g/m² · day) | Paper Powder/Toner Deposition | Black Spot | Paper Powder/Toner Deposition | Color Spot |
| Example 26 | B1 | 100.0 | — | — | 9.12 | ○ | ○ | ○ | ○ |
| Example 27 | B2 | 100.0 | — | — | 6.08 | ○ | ○ | ○ | ○ |
| Example 28 | B3 | 100.0 | — | — | 6.02 | ○ | ○ | ○ | ○ |
| Comparative Example 16 | B4 | 100.0 | — | — | 2.08 | X | X | X | X |
| Comparative Example 17 | B5 | 100.0 | — | — | 2.02 | X | X | X | X |
| Comparative Example 18 | B6 | 100.0 | — | — | 1.96 | X | X | X | X |
| Comparative Example 19 | B7 | 100.0 | — | — | 30 | X | X | X | X |
| Comparative Example 20 | B8 | 100.0 | — | — | 7.5 | X | X | X | X |
| Comparative Example 21 | B9 | 100.0 | — | — | 7.5 | X | X | X | X |
| Comparative Example 22 | B10 | 100.0 | — | — | 12.1 | X | X | X | X |
| Example 29 | B1 | 69.4 | B10 | 30.6 | 10 | ○ | ○ | ○ | ○ |
| Example 30 | B1 | 34.7 | B10 | 65.3 | 11 | ○ | ○ | ○ | ○ |
| Comparative Example 23 | B1 | 76.6 | B7 | 23.4 | 14 | Δ | X | Δ | X |
| Example 31 | B1 | 63.2 | B2 | 36.8 | 8 | ○ | ○ | ○ | ○ |
| Example 32 | B1 | 30.9 | B8 | 69.1 | 8 | ○ | ○ | ○ | ○ |
| Example 33 | B1 | 55.7 | B4 | 44.3 | 6 | ○ | ○ | ○ | ○ |
| Example 34 | B1 | 56.1 | B5 | 43.9 | 6 | ○ | ○ | ○ | ○ |
| Example 35 | B1 | 42.5 | B6 | 57.5 | 5 | Δ | Δ | Δ | Δ |
| Comparative Example 24 | B1 | 34.4 | B4 | 65.6 | 4.5 | X | X | X | X |
| Comparative Example 25 | B4 | 91.3 | B7 | 8.7 | 4.5 | X | X | X | X |
| Example 36 | B4 | 89.5 | B7 | 10.5 | 5 | Δ | Δ | Δ | Δ |

TABLE 7

| | First Binder Resin | | Second Binder Resin | | | Monochrome Machine | | Color Machine | |
|---|---|---|---|---|---|---|---|---|---|
| | Material | Content (% by mass) | Material | Content (% by mass) | Water Vapor Permeability (g/m² · day) | Paper Powder/Toner Deposition | Black Spot | Paper Powder/Toner Deposition | Color Spot |
| Example 37 | B4 | 60.9 | B7 | 39.1 | 13 | Δ | Δ | Δ | Δ |
| Comparative Example 26 | B4 | 57.3 | B7 | 42.7 | 14 | X | X | X | X |
| Example 38 | B4 | 46.1 | B8 | 53.9 | 5 | Δ | Δ | Δ | Δ |
| Example 39 | B4 | 27.7 | B9 | 72.3 | 6 | ○ | ○ | ○ | ○ |
| Example 40 | B4 | 70.6 | B10 | 29.4 | 5 | Δ | Δ | Δ | Δ |
| Comparative Example 27 | B5 | 91.1 | B7 | 8.9 | 4.5 | X | X | X | X |
| Example 41 | B5 | 89.3 | B7 | 10.7 | 5 | Δ | Δ | Δ | Δ |
| Comparative Example 28 | B5 | 57.2 | B7 | 42.8 | 14 | Δ | X | Δ | X |
| Example 42 | B5 | 45.6 | B8 | 54.4 | 5 | Δ | Δ | Δ | Δ |

TABLE 7-continued

| | First Binder Resin | | Second Binder Resin | | Water Vapor Permeability (g/m² · day) | Monochrome Machine | | Color Machine | |
|---|---|---|---|---|---|---|---|---|---|
| | Material | Content (% by mass) | Material | Content (% by mass) | | Paper Powder/Toner Deposition | Black Spot | Paper Powder/Toner Deposition | Color Spot |
| Example 43 | B5 | 27.4 | B9 | 72.6 | 6 | ○ | ○ | ○ | ○ |
| Example 44 | B5 | 70.1 | B10 | 29.9 | 5 | Δ | Δ | Δ | Δ |
| Comparative Example 29 | B6 | 90.9 | B7 | 9.1 | 4.5 | X | X | X | X |
| Example 45 | B6 | 89.2 | B7 | 10.8 | 5 | Δ | Δ | Δ | Δ |
| Comparative Example 30 | B6 | 55.3 | B7 | 44.7 | 14.5 | X | X | X | X |
| Example 46 | B6 | 45.1 | B9 | 54.9 | 5 | Δ | Δ | Δ | Δ |
| Example 47 | B6 | 27.1 | B9 | 72.9 | 6 | ○ | ○ | ○ | ○ |
| Example 48 | B6 | 69.7 | B10 | 30.3 | 5 | Δ | Δ | Δ | Δ |
| Example 49 | B1 | 100 | — | — | 9.12 | ○ | ○ | ○ | ○ |
| Example 50 | B1 | 100 | — | — | 9.12 | ○ | ○ | ○ | ○ |
| Example 51 | B1 | 100 | — | — | 9.12 | ○ | ○ | ○ | ○ |
| Example 52 | B1 | 100 | | | 9.12 | ○ | ○ | ○ | ○ |
| Comparative Example 31 | B6 | 100 | | | 1.96 | X | X | X | X |
| Comparative Example 32 | B6 | 100 | | | 1.96 | X | X | X | X |

TABLE 8

| | Binder Resin of Charge Transport Layer | | | | | Binder Resin of Charge Generation Layer | | | | |
|---|---|---|---|---|---|---|---|---|---|---|
| | First Binder Resin | | Second Binder Resin | | Water Vapor Permeability (g/m² · day) | First Binder Resin | | Second Binder Resin | | Water Vapor Permeability (g/m² · day) |
| | Material | Content (% by mass) | Material | Content (% by mass) | | Material | Content (% by mass) | Material | Content (% by mass) | |
| Example 1 | B5 | 100 | | | 2.02 | B1 | 100 | | | 9.12 |
| Example 53 | B6 | 100 | | | 1.96 | B2 | 100 | | | 6.08 |
| Example 54 | B5 | 76 | B2 | 24 | 3 | B3 | 100 | | | 6.02 |
| Example 55 | B4 | 51 | B3 | 49 | 4 | B1 | 70 | B10 | 30 | 10 |
| Example 56 | B4 | 26 | B3 | 74 | 5 | B6 | 27.1 | B9 | 72.9 | 6 |
| Example 57 | B6 | 27.1 | B9 | 72.9 | 6 | B1 | 34.7 | B10 | 65.3 | 11 |

| | Monochrome Machine | | Color Machine | | Monochrome Machine | | Color Machine | |
|---|---|---|---|---|---|---|---|---|
| | Paper Powder/ Toner Deposition | Black Spot | Paper Powder/ Toner Deposition | Color Spot | Ghost | Fog | Ghost | Fog |
| Example 1 | ○ | ○ | ○ | ○ | ○ | ○ | ○ | ○ |
| Example 53 | ○ | ○ | ○ | ○ | ○ | ○ | ○ | ○ |
| Example 54 | ○ | ○ | ○ | ○ | ○ | ○ | ○ | ○ |
| Example 55 | ○ | ○ | ○ | ○ | Δ | ○ | Δ | ○ |
| Example 56 | ○ | ○ | ○ | ○ | X | Δ | X | Δ |
| Example 57 | ○ | ○ | ○ | ○ | X | X | X | X |

As shown in the above tables, both a monochrome machine and a color machine provided similar results for both a single layer type photoconductor and a laminate type photoconductor. That is, it was confirmed that, in any of Comparative Examples, the occurrence level of minute black spots and color spots as well as the toner/paper powder adhesion level are rated as x, whereas, in the Examples, both produced good results rated as from Δ to ○. In addition, the results of Table 8 show that Examples 1, 53, 54, and 55, wherein the water vapor permeability of the binder resin of the charge transport layer was set to about 4 g/m²·day or less which is lower than the water vapor permeability of the binder resin in the charge generation layer, provided good results with respect to both ghost and fog.

As mentioned above, according to the present invention, an electrophotographic photoconductor which provides a stable high-quality image in any environment without generating minute black spots or color spots during the initial printing in high-temperature and high-humidity environment even when mounted on a high-quality/high-speed monochrome machine or a tandem color machine equipped with a cleaner-less process of nonmagnetic one-component contact developing system using polymerized toner; a manufacturing method thereof; and an electrophotographic apparatus using the same are confirmed to be attained.

What is claimed is:

1. A positively charged electrophotographic photoconductor, comprising an electroconductive support; and a single layer-type photosensitive layer provided on the electroconductive support and including a charge generation material, a hole transport material, an electron transport material, and a mixed binder resin that comprises at least two resins including a polycarbonate-based resin, wherein the at least two resins are selected to provide the mixed binder resin with a water vapor permeability ranging from 5 to 13 g/m²·day.

2. The electrophotographic photoconductor according to claim 1, wherein the mixed binder resin contains a resin having a repeating unit represented by formula (1) below:

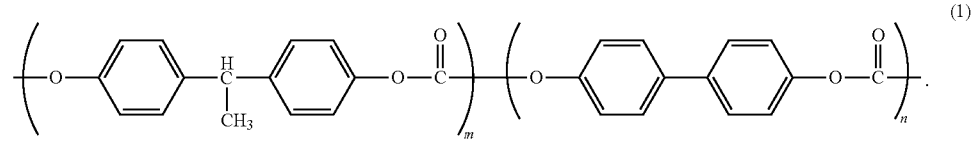

(1)

$m/(m + n) = 0.6\sim 0.9$

3. The electrophotographic photoconductor according to claim 1, wherein the mixed binder resin contains a resin having a repeating unit represented by formula (1) below and a repeating unit represented by formula (2) below:

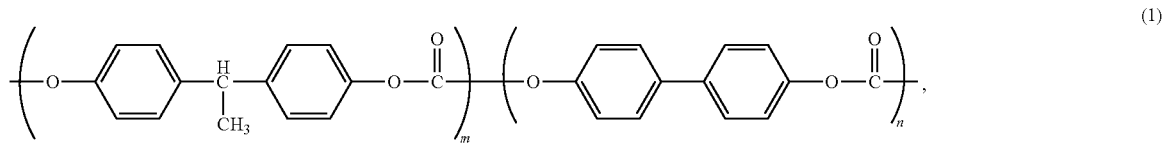

(1)

$m/(m + n) = 0.6\sim 0.9$

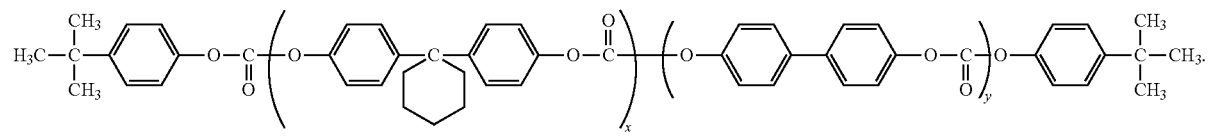

(2)

$x/(x + y) = 0.6\sim 0.9$

4. The electrophotographic photoconductor according to claim 1, wherein the mixed binder resin contains a resin having a repeating unit represented by formula (2) below and a repeating unit represented by formula (3) below:

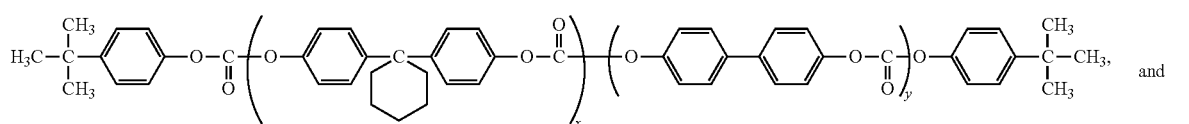

(2)

$x/(x + y) = 0.6\sim 0.9$

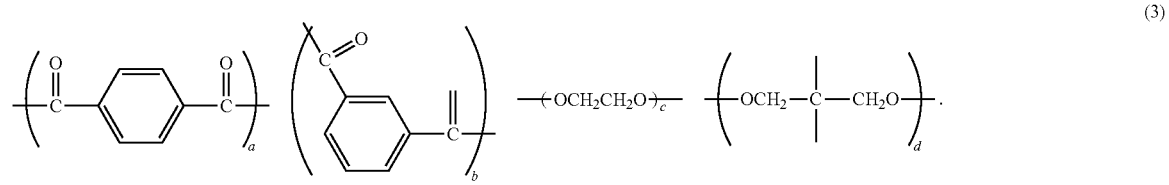

(3)

$a + b + c + d = 100 \text{ mol }\%, |a + b| - |c + d| \leq 1 \text{ mol }\%$

5. The electrophotographic photoconductor according to claim 1, wherein the charge generation material comprises at least titanyl phthalocyanine.

6. A method of producing the electrophotographic photoconductor according to claim 1, wherein the single layer-type photosensitive layer containing a mixed binder resin is formed by a dip coating method.

7. An electrophotographic apparatus equipped with the electrophotographic photoconductor according to claim 1.

8. The electrophotographic apparatus according to claim 7, wherein the electrophotographic apparatus is equipped with a contact developing system that is a nonmagnetic one-component contact developing system using polymerized toner in a cleaner-less process.

9. The positively charged electrophotographic photoconductor according to claim 1, wherein the mixed binder resin contains a resin having a repeating unit represented by formula (1) or formula (2) below and a repeating unit represented by formula (3) below:

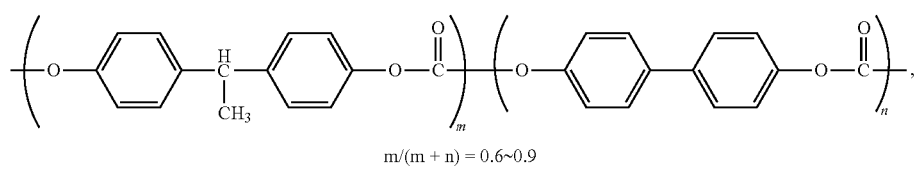

m/(m + n) = 0.6~0.9

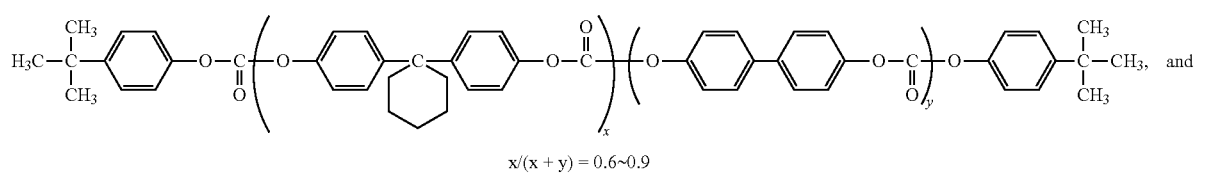

x/(x + y) = 0.6~0.9

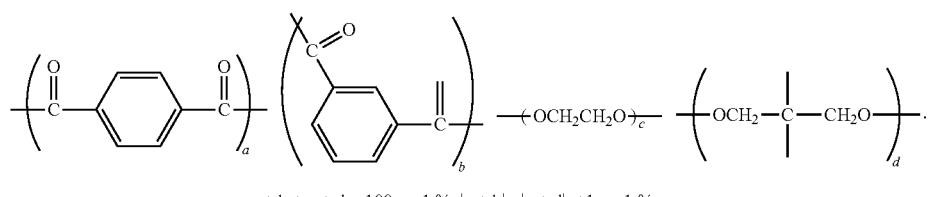

a + b + c + d = 100 mol %, |a + b| - |c + d| ≤ 1 mol %

10. A positively charged electrophotographic photoconductor, comprising:
   an electroconductive support;
   a charge transport layer provided on the electroconductive support and containing at least a hole transport material and a binder resin; and
   a charge generation layer provided on the charge transport layer and including at least a charge generation material, a hole transport material, an electron transport material, and a mixed binder resin that comprises at least two resins including a polycarbonate-based resin,
   wherein the at least two resins are selected to provide the mixed binder resin of the charge generation layer with a water vapor permeability ranging from 5 to 13 g/m²·day.

11. The electrophotographic photoconductor according to claim 10, wherein the mixed binder resin contains a resin having a repeating unit represented by formula (1) below:

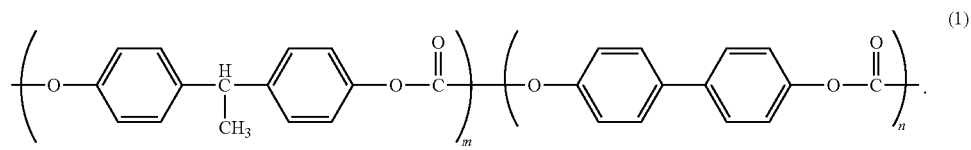

m/(m + n) = 0.6~0.9

12. The electrophotographic photoconductor according to claim 10, wherein the mixed binder resin contains a resin having a repeating unit represented by formula (1) below and a repeating unit represented by formula (2) below:

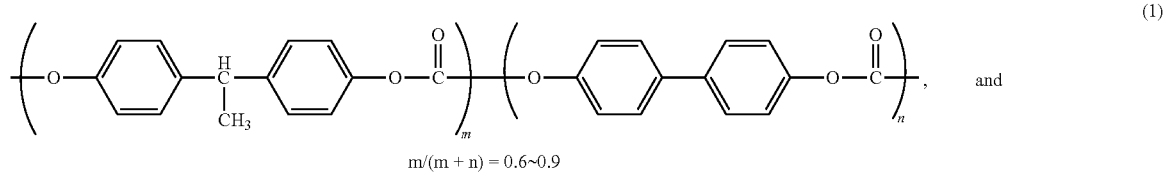
(1)

$m/(m + n) = 0.6\sim0.9$

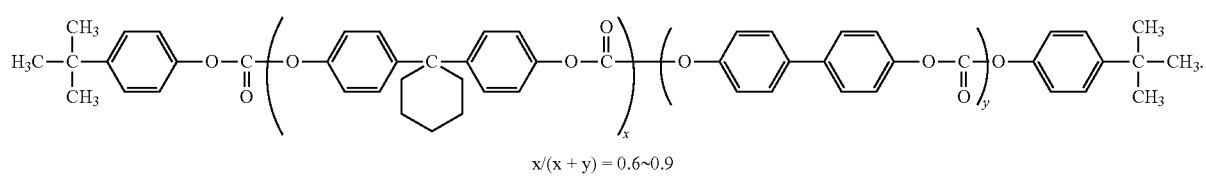
(2)

$x/(x + y) = 0.6\sim0.9$

13. The electrophotographic photoconductor according to claim 10, wherein the mixed binder resin contains a resin having a repeating unit represented by formula (2) below and a repeating unit represented by formula (3) below:

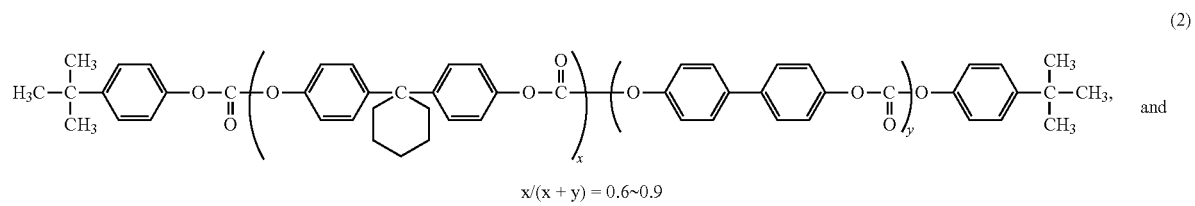
(2)

$x/(x + y) = 0.6\sim0.9$

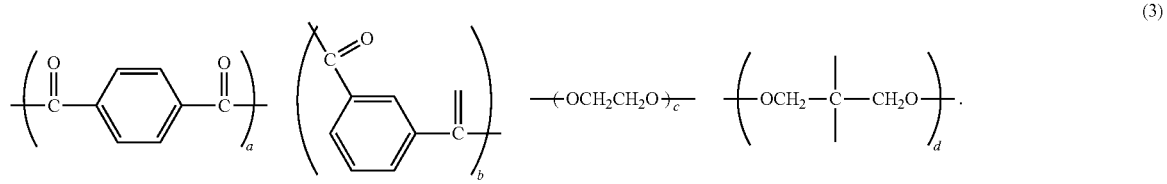
(3)

$a + b + c + d = 100 \text{ mol \%}, |a + b| - |c + d| \leq 1 \text{ mol \%}$

14. The electrophotographic photoconductor according to claim 10, wherein the charge generation material comprises at least titanyl phthalocyanine.

15. A method of producing the electrophotographic photoconductor according to claim 10, wherein the charge generation layer containing a mixed binder resin is formed by a dip coating method.

16. An electrophotographic apparatus equipped with the electrophotographic photoconductor according to claim 10.

17. The electrophotographic apparatus according to claim 16,
wherein the electrophotographic apparatus is equipped with a contact developing system that is a nonmagnetic one-component contact developing system using polymerized toner in a cleaner-less process.

18. The positively charged electrophotographic photoconductor, according to claim 10, wherein the mixed binder resin in the charge generation layer contains a resin having a repeating unit represented by formula (1) or formula (2) below and a repeating unit represented by formula (3) below:

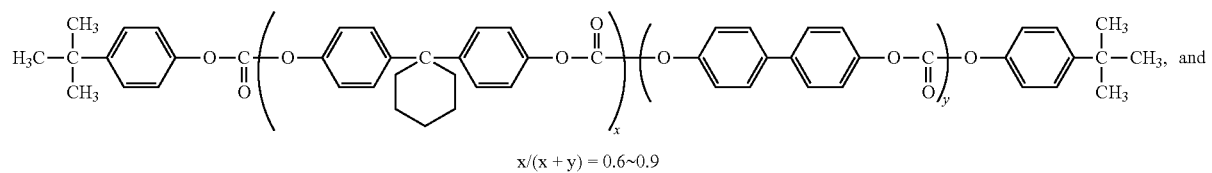
$$x/(x + y) = 0.6\sim0.9 \quad (2)$$
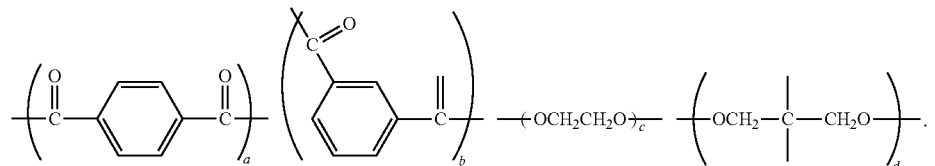
$$a + b + c + d = 100 \text{ mol }\%, |a + b| - |c + d| \leq 1 \text{ mol }\% \quad (3)$$
19. The positively charged electrophotographic photoconductor, according to claim 10, wherein the water vapor permeability of the binder resin of the charge transport layer is 4 g/m²·day or less.
* * * * *